United States Patent
Rudnicki et al.

[11] Patent Number: 5,900,167
[45] Date of Patent: May 4, 1999

[54] NARROW PREP MIG WELDING

[76] Inventors: James L. Rudnicki, Glenburn; Edward K. Ellis, Bangor; Douglas J. Merrill, East Holden; Lawrence E. Rentz, Brewer, all of Me.

[21] Appl. No.: 08/928,895

[22] Filed: Sep. 12, 1997

[51] Int. Cl.⁶ .................................................... B23K 9/173
[52] U.S. Cl. ...................... 219/74; 219/136; 219/137.61
[58] Field of Search ................................. 219/137 R, 136, 219/137.61, 125.1, 125.11, 74, 75, 124.34

[56] References Cited

U.S. PATENT DOCUMENTS

| | | | |
|---|---|---|---|
| 3,123,702 | 3/1964 | Keidel et al. | 219/74 |
| 3,239,648 | 3/1966 | Syrigos | 219/74 |
| 3,826,888 | 7/1974 | Garfield et al. | 219/74 |
| 3,924,095 | 12/1975 | Lucas, Jr. | 219/74 |
| 3,992,603 | 11/1976 | Reynolds | 219/74 |
| 4,188,526 | 2/1980 | Asano | 219/137 R |
| 4,289,950 | 9/1981 | Griebeler | 219/124.34 |
| 4,309,590 | 1/1982 | Stol | 219/136 |
| 4,346,279 | 8/1982 | Lessmann et al. | 219/75 |
| 4,504,729 | 3/1985 | Asano | 219/74 |
| 4,517,438 | 5/1985 | Sugitani et al. | 219/136 |
| 4,591,685 | 5/1986 | Hinger et al. | 219/74 |
| 4,891,493 | 1/1990 | Sato et al. | 219/137 R |

*Primary Examiner*—Clifford C. Shaw

[57] ABSTRACT

MIG welding apparatus includes a torch body; a machine barrel extending forwardly of the torch body; a contact tip extending forwardly from the machine barrel; and a pair of gas supply tubes extending along and substantially parallel to the contact tip, enabling reduction in the weld prep angle to about three degrees.

10 Claims, 3 Drawing Sheets

NARROW PREP MIG WELDING

TECHNICAL FIELD

This invention relates to automated MIG welding apparatus with particular application to the welding of turbine components.

BACKGROUND

By way of brief background, Metal Inert Gas (MIG) welding employs a continuously fed wire electrode (consumable) and a shielding gas. Generally, the wire consumable is fed through a torch to the workpiece. The latter is connected by an earth lead which completes the circuit. The wire electrode is held at a potential above ground using a power source capable of supplying several hundred amps of current to produce an arc. When the wire consumable touches the workpiece, an arc is formed which melts localized metal of the workpiece and the wire, forming a molten pool which forms the weld. The shielding gas, usually an argon/$CO_2$ mixture, is also supplied through the torch and protects the weld from oxidation and provides the desired arc characteristics.

Up until 1989, MIG welding in steam turbine diaphragms required 22° weld prep angles in order for the traditional weld cone to access the bottom of the weld and to provide adequate gas shielding. In other words, the access groove required a 22° angle to enable the welding torch to reach the weld area. Although a good quality weld resulted, this led to excessive weld material being deposited into the diaphragm, increasing the product's distortion, cycle and cost.

In 1989, an adjustable copper sheath was developed which extended from 1" to 8" beyond the original end of the cone. This configuration was developed in order to reduce the weld prep angle from 22° to 11°. This significantly reduced the weld volume and direct costs for each diaphragm, but still left substantial room for improvement.

A concept of narrow prep welding known as "Fine Line Welding" was recently introduced in connection with Tungsten Inert Gas (TIG) welding. Although this technology would certainly reduce the distortion found in standard diaphragms, it has two qualities which make it inappropriate for diaphragm production use, namely, a) the machinery currently being used for this application is very delicate, still in the development stage and not rugged enough for the manufacturing environment and b) the material deposition rate is too low to be satisfactory for diaphragm structural welding. The development of a weld process that permitted even smaller weld prep angles consequently focused on modification of existing MIG welding techniques.

Weld distortion associated with traditional MIG welding apparatus has typically resulted in unfavorable:

1) Steam path dimensional deviations between before and after welding conditions;
2) Circumferential shrinkage of the diaphragm halves leading to poor joint blade matching in subsequent finishing operations;
3) Excessive manual deburring of steam path configuration which had been distorted due to welding;
4) Weld splatter as a result of excess weld and weld buildups required for access to traditional sized preps; and
5) Distortion of radial location of steam path sidewalls and setbacks to the trailing edges of the blades.

Labor costs associated with MIG welding in the turbine environment are also high. Examples of operations which drive these costs in a steam turbine diaphragm welding application are, 1) Welding and cleaning of the structural and cover welds of the diaphragm,
2) Welding of diaphragm appendage rings and outer ring buildups required to allow access to the traditional sized weld preps,
3) Use of excess shielding gas and filler material in welding larger weld preps,
4) Machining time for weld preps and appendage rings,
5) Material costs for appendage rings.

SUMMARY OF THE INVENTION

The objective that led to the development of this invention was to reduce the distortion caused by large weld volume and heat input, and direct costs associated with traditional automated MIG welding apparatus. The tooling modifications of this invention contribute to achieving these objectives through a reduction in weld volume and heat input into the diaphragm. This is accomplished by enabling a smaller angle prep opening or angle (on the order of 3°) and through redesigned hardware which allows welding to be performed in greater than normal depths. The hardware allows for adjustments in depth of weld based on the given product requirements, resulting in a maximum of 8" groove depth.

This invention also provides shielding gas coverage both upstream and downstream of the weld puddle to yield good quality welds. In addition, since weld buildups and appendage rings are no longer needed, weld distortion and applied labor are further reduced.

Although hardware has been modified in accordance with this invention, no changes have been made to the standard MIG welding parameters. In fact, with the exception of the trailing and leading extended gas cup configuration and related hardware, and the ceramic coated contact tip, the invention utilizes all of the hardware traditionally used for standard MIG welding.

In the exemplary embodiment, rather than having the torch cone or extending copper sheath protect the contact tip from arcing out with the sidewalls of the prep, a ceramic coated contact tip is used. The resulting configuration allows for greater depths to be achieved while reducing the required weld prep sidewall angle for clearance. The tip is a copper tube with a ¼" outer diameter, with lengths ranging from 4" to 12". At the same time, in order to provide adequate gas shielding for the leading and trailing portions of the weld puddle, small diameter extended gas tubes are employed, and are located externally of the torch. Again, the gas flow rates used in connection with this invention are comparable to those used in traditional MIG welding.

The shielding gas hardware configuration consists of an adjustable head which is mounted to the existing MIG weld torch. The two pronged gas shielding dispenser is connected directly into a gas line. This configuration deviates from the traditional MIG welding practice of dispensing the gas through the cones surrounding the contact tip with the tubing line directly connected with the gas supply. This separation of the gas supply tubes from the main torch head allows for easy removal and replacement, and also to a smaller front-to-back profile.

Improvements to the control of the aforementioned parameters will lead to improved turbine efficiency, reduced rework and greater control of critical dimensional characteristics of the gas turbine diaphragms.

In addition, the reduced weld volume leads to a significant reduction in direct labor costs.

In its broader aspects, therefore, the present invention relates to welding apparatus comprising a torch body; a machine barrel extending forwardly of the torch body; a contact tip extending forwardly from the machine barrel; and a pair of supply gas tubes extending externally along and substantially parallel to the contact tip.

Other objects and advantages of the invention will become apparent from the detailed description which follows.

BEST MODE FOR CARRYING OUT THE INVENTION

Figures 1, 1A, 2, 2A:
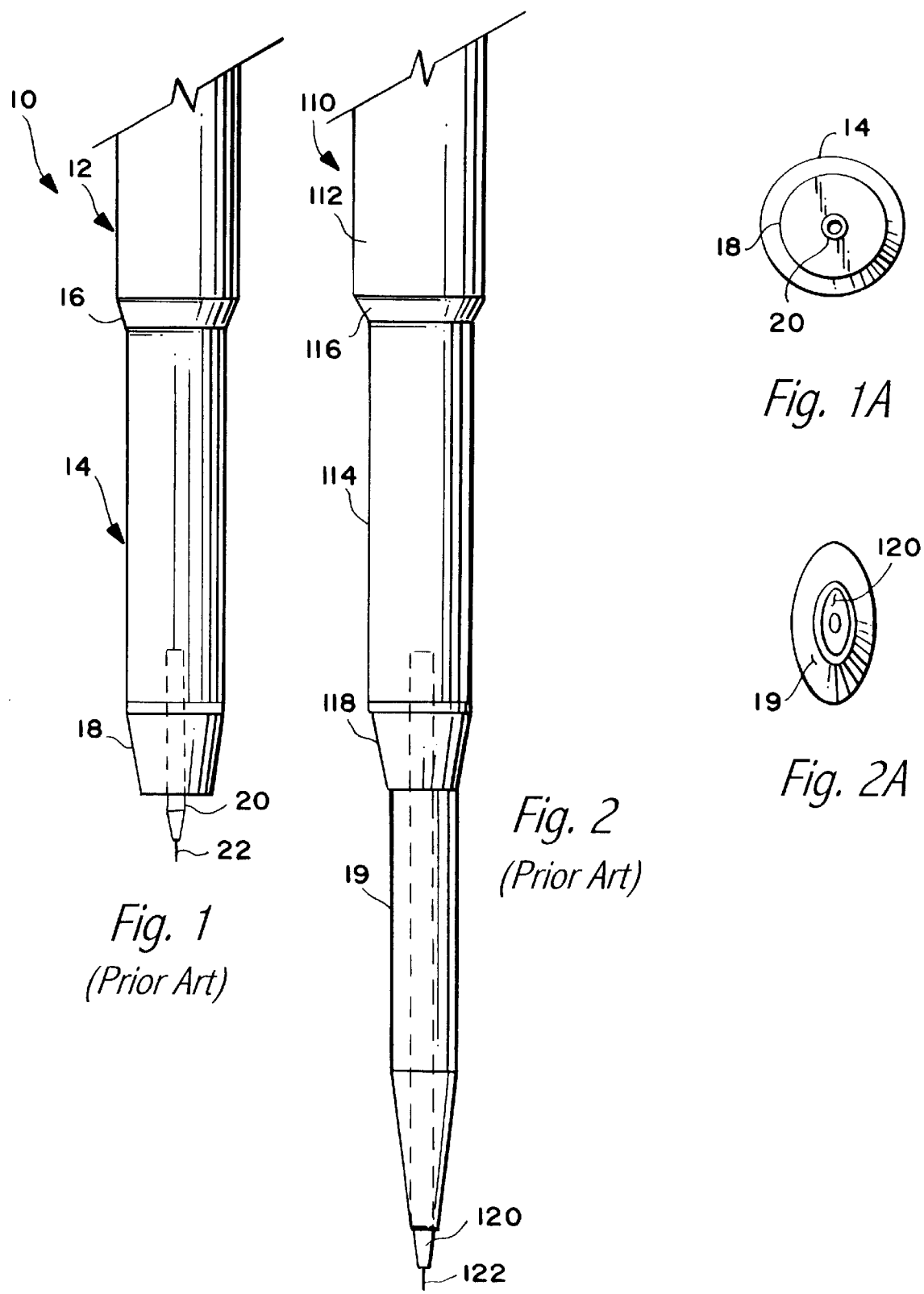
FIG. 1 is a partial side elevation of a conventional MIG welding tool.
FIG. 1A is a partial bottom plan view of FIG. 1.
FIG. 2 is a partial side elevation of another conventional MIG welding tool.
FIG. 2A is a partial bottom plan view of FIG. 2.
Figures 1B, 2B, 3B:
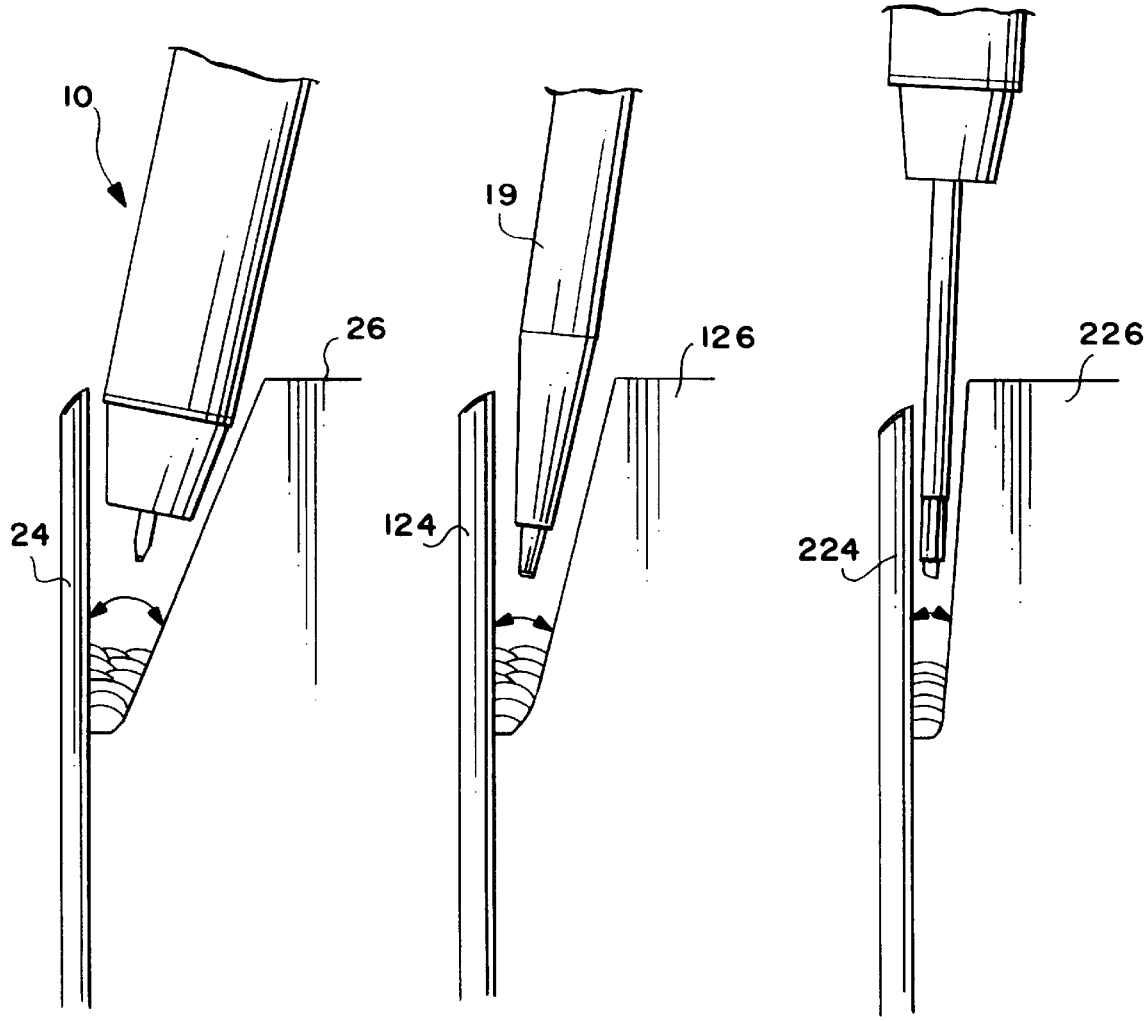
FIG. 1B is a partial side elevation of the tool of FIG. 1 shown in proximity to an area of a steam turbine diaphragm to be welded.
FIG. 2B is a partial side elevation of the tool of FIG. 2 shown in proximity to an area of the steam turbine diaphragm to be welded.
FIG. 3B is a partial side elevation of the MIG welding tool shown in FIG. 3 in close proximity to an area of a steam turbine diaphragm to be welded.

Referring now to FIGS. 1, 1A and 1B, a conventional MIG welding tool is illustrated. The tool 10 in FIG. 1 includes a torch body 12 and a narrower (smaller diameter) barrel portion 14 connected to the torch body at a shoulder 16. The barrel typically has a diameter of about 1 inch. At the forward end of the barrel 14, there is located a core cup or cone 18 with a weld wire feed tube 20 projecting out of the core cup in concentric relationship therewith. The core cup 18 has a diameter at its smaller, forwardmost end of about ⅝ inch. Feed tube 20 serves to supply the consumable weld wire 22 to the weld site. Shielding gas is supplied to the weld area through the torch 12, in the annular space between the cone 18 and the tube 20.

For the manner in which the tool 10 is employed in the context of welding a steam turbine diaphragm, reference is made to FIG. 1B where the tool 10 is located in a groove or slot between a steam turbine diaphragm band 24 and ring or web 26. The weld prep angle A required with this tooling setup is approximately 22°.

Turning to FIGS. 2, 2A and 2B, a modified tooling arrangement is illustrated and, for convenience, reference numerals used to designate corresponding components are the same as those used in connection with FIGS. 1–1B but with the prefix "1" added. Thus, the MIG welding tool 110 includes a torch body 112 connected to a barrel portion 114 by means of a tapered shoulder 116. The core cup 118 is located at the forward end of the barrel. But in this embodiment, an adjustable gas cup 19 extends forwardly of the core cup 118. The wire supply tube or contact tip 120 extends beyond the adjustable gas cup and supplies the consumable wire 122 to the weld site. The shielding gas is supplied to the weld site in the oval space between the cup 19 and the contact tip 120. As best seen in FIG. 2A, the cross-sectional shape of the adjustable gas cup is elliptical or oval and has a minor axis dimension of about 7/16 to ⅝ inch. In use, the tool is moved in a direction parallel to the major axis, so that it is the minor axis which is critical to the weld prep angle. The minor axis dimension leads to a narrower weld prep angle as shown in FIG. 2B. Specifically, the weld prep angle B has been reduced from 22° to 11° in this prior embodiment.

Figures 3, 3A:
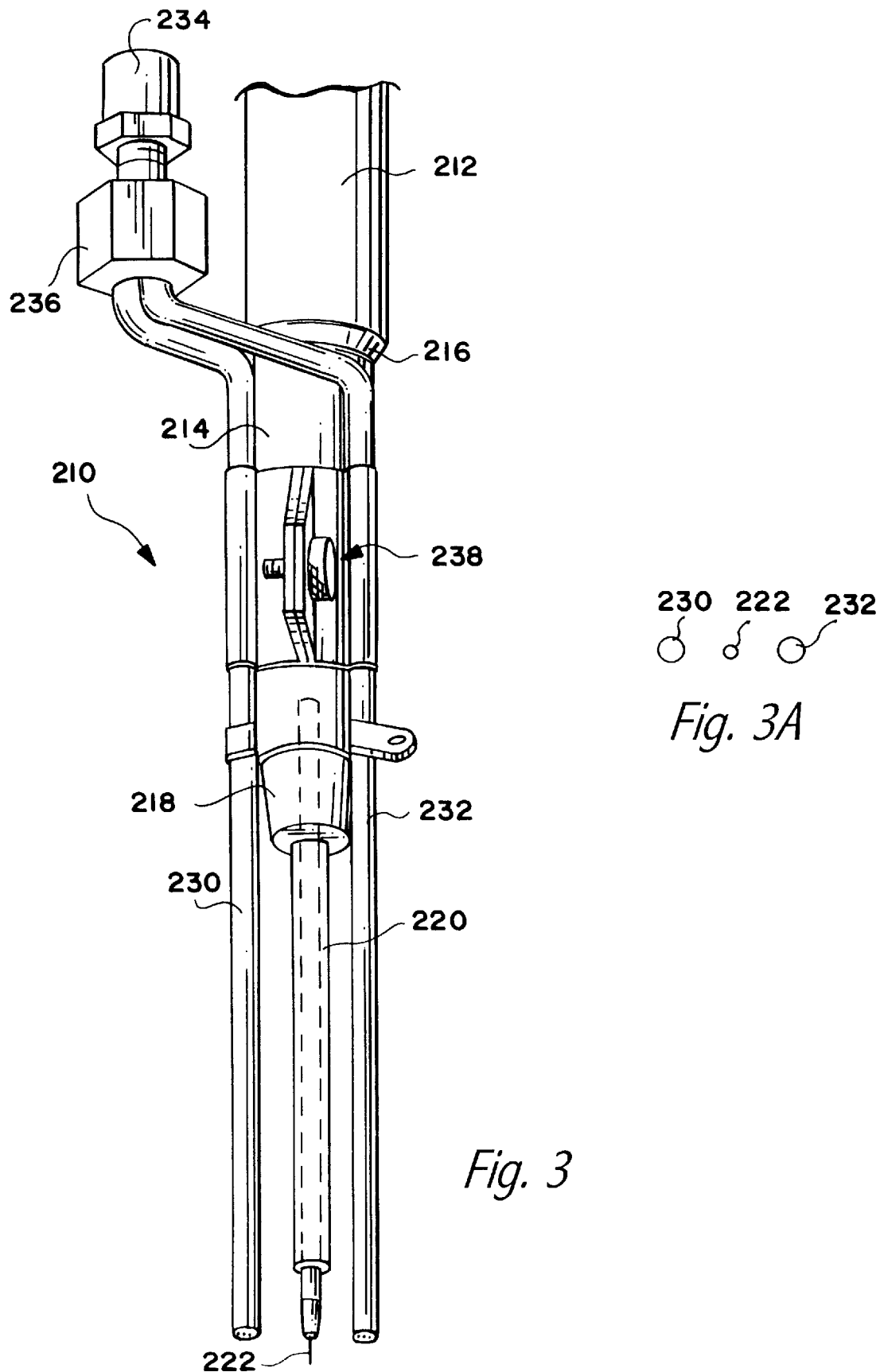
FIG. 3 is a partial side elevation of a MIG welding tool in accordance with this invention.
FIG. 3A is a partial bottom plan view of the tool shown in FIG. 3.

With reference now to FIGS. 3, 3A and 3B, an improved MIG welding tool in accordance with this invention is illustrated. In this embodiment, the tool 210 includes a torch body 212 connected to a barrel portion 214 by means of a tapered shoulder 216. A standard core cup 218 is affixed to the forwardmost end of the barrel. In this embodiment, an extended contact tip or wire supply tube 220 (preferably copper) projects forwardly of the core cup 218, and supplies the consumable wire 222 to the weld site. The tube 220 has a diameter of about ¼" and a length ranging from 4 to 12". Tube 220 is coated with a ceramic material to insulate the tube, so that there is no need for the core cup to extend axially substantially to the free end of the contact tip.

The shielding gas is supplied in two discrete small diameter (⅜ inch diameter) copper tubes 230 and 232 which are located on diametrically opposite sides of the contact tube 220. The gas supply tubes 230 and 232 are connected to a gas supply conduit 234 at a gas inlet fitting 236 where the pair of supply tubes 230 and 232 are merged with the supply tube 234. The gas supply tubes 230 and 232 are secured to the machine barrel 214 by means of an adjustable clamp 238. In this manner, the circumferential location of the gas supply tubes 230 and 232 relative to the contact tip 220 may be adjusted as desired. Tubes 230 and 232 may also be adjusted axially to a limited extent. In this regard, the tubes 230, 232 need not extend to the same linear or axial degree as the contact tip 220.

It is readily apparent from a comparison of FIGS. 3A with FIGS. 1A and 2A, that the cross-sectional profile of the tooling in accordance with this invention has been significantly reduced. In fact, the width dimension at the tip of the tool is only ⅜", as determined by the diameters of the tubes 230, 232. As a result, and with reference specifically to FIG. 3B, it will be appreciated that the tool 210 requires a weld prep angle of only 3°. In this regard, the apparatus shown in FIG. 3 is moved in use parallel to the plane containing the tubes 230, 232 and contact tip 220, although the tubes 230, 232 need not be perfectly linearly aligned.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Welding apparatus comprising:
   a torch body;
   a machine barrel extending forwardly of the torch body;
   a contact tip extending forwardly from the machine barrel; and
   a pair of shielding gas supply tubes extending externally along and substantially parallel to said contact tip; and wherein means are provided on said machine barrel for adjusting said gas supply tubes circumferentially about said machine barrel.

2. The apparatus of claim 1 wherein said contact tip is composed of copper with an external ceramic coating.

3. The apparatus of claim 1 wherein said gas supply tubes are located on opposite sides of said contact tip.

4. The apparatus of claim 1 including a fitting adapted for communication with a source of gas, said pair of gas supply tubes extending from said fitting.

5. The apparatus of claim 1 wherein each gas supply tube has a diameter of about ⅜ inch.

6. Welding apparatus comprising:
   a torch body;
   a machine barrel extending forwardly of the torch body;
   a contact tip extending forwardly from the machine barrel; and
   a pair of shielding gas supply tubes extending externally along and substantially parallel to said contact tip; wherein means are provided on said machine barrel for adjusting said gas supply tubes circumferentially about said machine barrel; and wherein said contact tip and said pair of gas supply tubes are sized and configured to enable a weld prep angle of about 3°.

7. The apparatus of claim 6 wherein said contact tip has a diameter of about ¼ inch.

8. The apparatus of claim 7 wherein each gas supply tube has a diameter of about ⅜ inch.

9. Welding apparatus for MIG welding comprising:
   a torch body;
   a machine barrel extending forwardly of the torch body;
   a contact tip extending forwardly from the machine barrel; and
   a pair of gas supply tubes extending externally along and substantially parallel to said contact tip; wherein means are provided on said machine barrel for adjusting said gas supply tubes circumferentially about said machine barrel; and wherein said contact tip and said pair of gas supply tubes have a maximum profile dimension of about ⅜ inch in one direction which is substantially perpendicular to movement of the apparatus in a welding operation.

10. The welding apparatus of claim 9 wherein said contact tip is coated with ceramic material.

* * * * *